B. C. ROWELL, DEC'D.
L. C. ROWELL, EXECUTRIX.
BRAKE SHOE.
APPLICATION FILED SEPT. 7, 1915.
1,187,468.
Patented June 13, 1916.
3 SHEETS—SHEET 2.
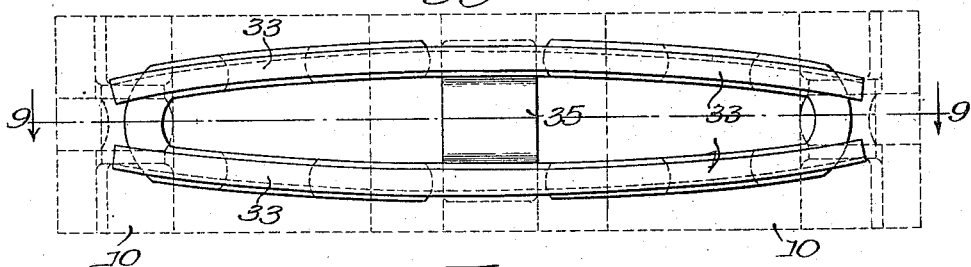
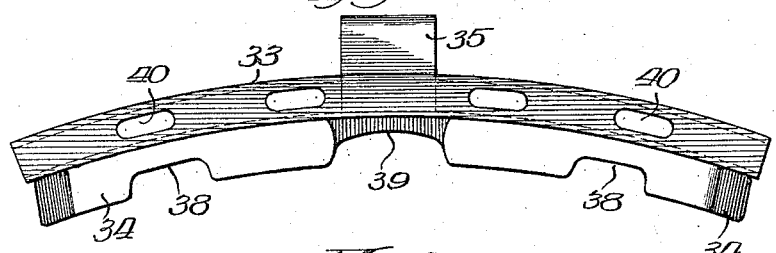
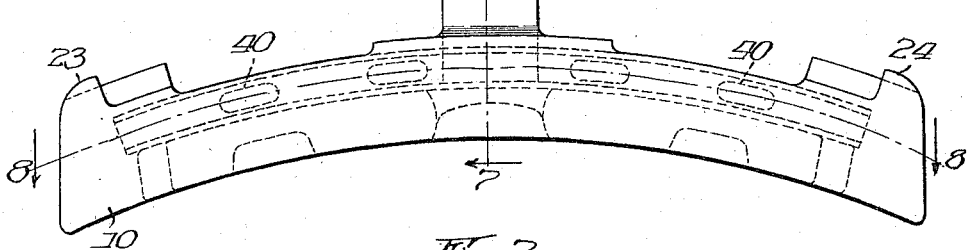
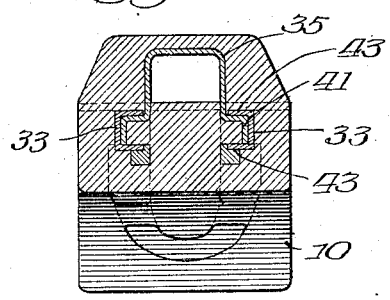
Witnesses:
Inventor B. C. ROWELL, DEC'D.
L. C. ROWELL, EXECUTRIX.
BRAKE SHOE.
APPLICATION FILED SEPT. 7, 1915.
1,187,468.
Patented June 13, 1916.
3 SHEETS—SHEET 3.
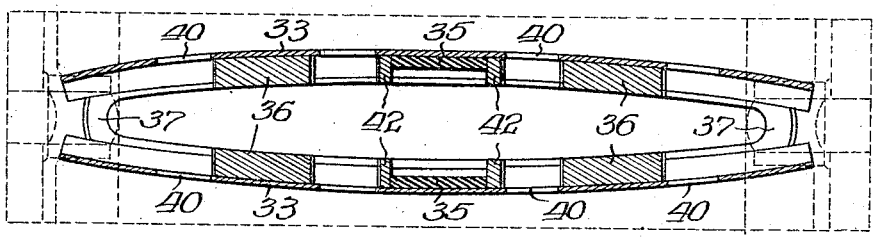
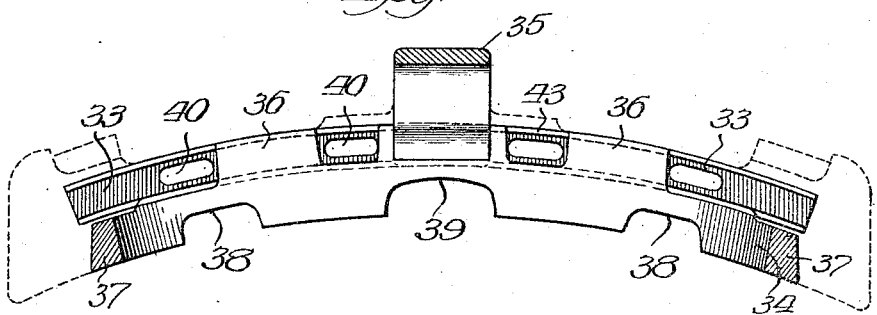
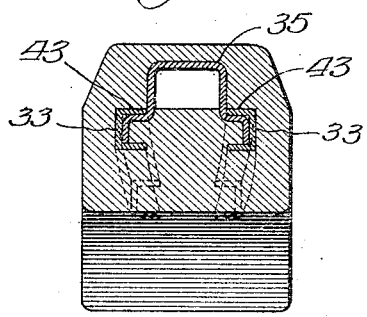

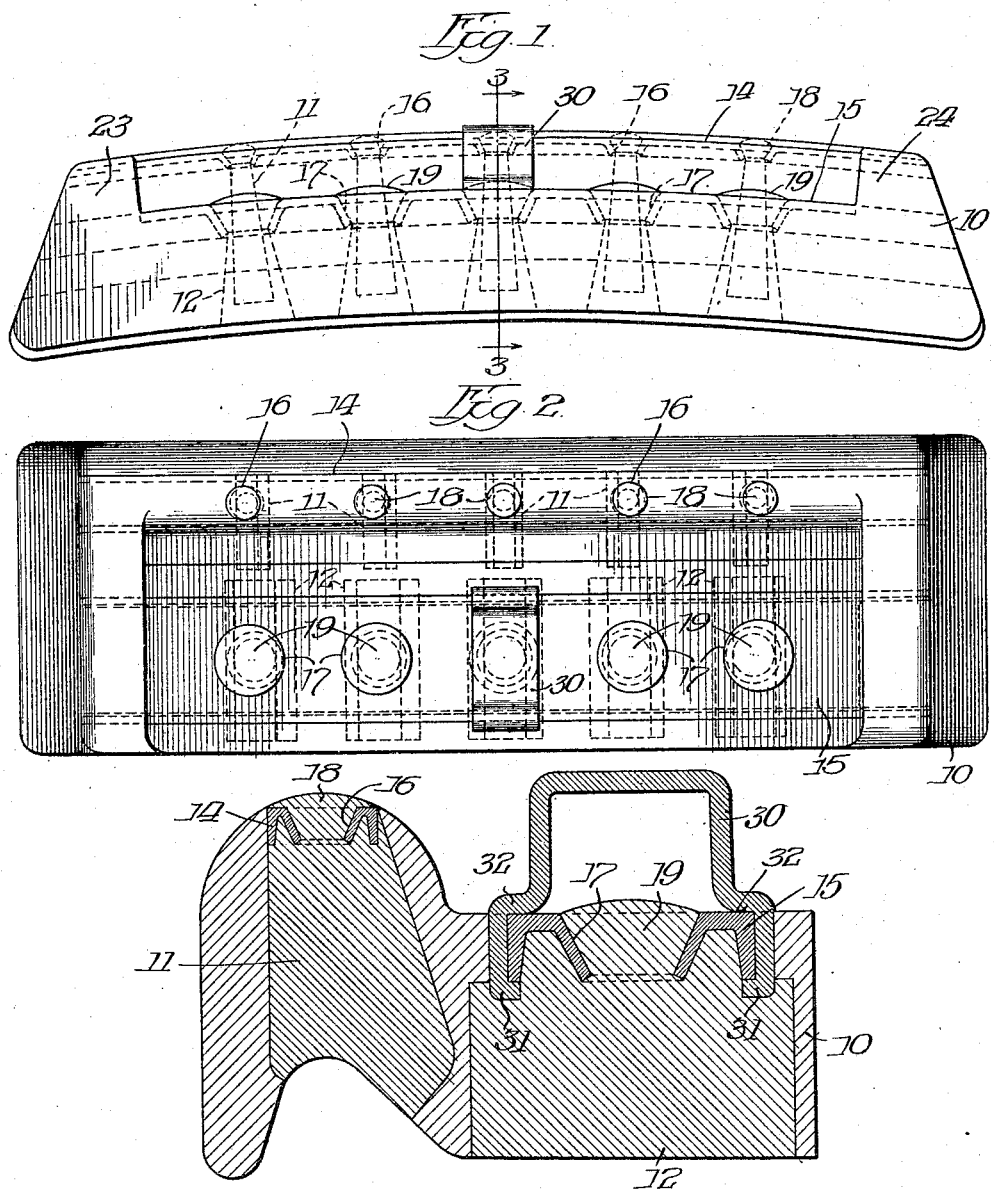

UNITED STATES PATENT OFFICE.

BENTON C. ROWELL, DECEASED, LATE OF CHICAGO, ILLINOIS, BY LILLA C. ROWELL, EXECUTRIX, OF CHICAGO, ILLINOIS.

BRAKE-SHOE.

1,187,468.  Specification of Letters Patent.  Patented June 13, 1916.

Continuation in part of application Serial No. 50, filed January 2, 1915. This application filed September 7, 1915. Serial No. 49,270.

*To all whom it may concern:*

Be it known that BENTON C. ROWELL, late a citizen of the United States, residing at Chicago, in the county of Cook and State of Illinois, did invent certain new and useful Improvements in Brake-Shoes, of which the following is a specification.

The present invention relates to brake shoes, such as commonly used on railway rolling stock, and more particularly to brake shoes for this purpose which are reinforced and contain wear resistant inserts of harder material than the body of the shoe.

This application is in part a continuation of application, Serial Number 50, filed January 2nd 1915.

The principal objects of the present invention are to provide improved means for connecting the strap and body reinforcement; to provide improved means for connecting the strap, reinforcement, wearing inserts and body portion; to provide improved means for connecting the reinforcement and wearing inserts; to provide improved means for connecting reinforcing members of channeled cross-section to the other portions of the shoe; to provide improved means for preventing sections of the body from falling should fracture occur, and generally, to improve, cheapen and simplify the construction of brake shoes for railway and other vehicles, together with such other objects as will hereinafter appear.

In attaining these and other objects and advantages to be hereinafter set forth, there is provided a construction two embodiments of which are illustrated in the accompanying drawings, in which:—

Figure 1 is a side elevation of a brake shoe constructed in accordance with the present invention; Fig. 2 is a plan view of the brake shoe illustrated in Fig. 1; Fig. 3 is a vertical transverse section on the line 3—3 of Fig. 1; Fig. 4 is a plan view of a further form of shoe, the body of the shoe being indicated in dotted lines; Fig. 5 is a side elevation of the reinforcement, wearing insert and supporting lug shown in Fig. 4; Fig. 6 is a view similar to Fig. 5 showing the reinforcement, wearing insert and supporting lug in their relation to the body of the shoe; Fig. 7 is a vertical transverse section on the line 7—7 of Fig. 6; Fig. 8 is a longitudinal horizontal section on the line 8—8 of Fig. 6; Fig. 9 is a longitudinal vertical section on the line 9—9 of Fig. 4; and Fig. 10 is a vertical transverse section similar to that shown in Fig. 7, the wearing insert being omitted.

Reference will now be made to Figs. 1 to 3 which show one of the two forms of construction illustrated. The brake shoe consists of a body portion 10 provided with two series of wearing inserts 11 and 12. The first set of inserts is arranged over the flange of the wheel, as will be clearly seen from Fig. 3. The second set of wearing inserts is arranged to contact with the flat portion of the wheel. The shoe is reinforced by means of inverted channeled members 14 and 15 preferably arranged as shown along the upper surface of the brake shoe. Although the reinforcing members 14 and 15 are in contact with the body of the shoe along their vertical and under faces only, except at their ends, they are securely connected to the body portion of the shoe by means of the wearing inserts 11 and 12. For this purpose apertures 16 and 17 respectively are arranged in the reinforcing members 14 and 15 through which upwardly expanding projections 18 and 19 from the inserts 11 and 12 extend. To enable these projections to grip the reinforcement, the edges of these apertures are depressed below the normal surface of the channeled reinforcement in such a way as to form what are practically countersunk apertures adapted to engage the complementarily formed ends 18 and 19 of the inserts. While the projecting ends 18 and 19 of these inserts are arranged upwardly expanding in order to engage the reinforcement, the body part of the insert is preferably arranged so that it expands downwardly in one direction at least. The object of this is to hold together the body of the shoe and the reinforcement, and also to prevent sections of the brake shoe from falling should a fracture occur. Both sets of inserts are formed with the flat surfaces substantially perpendicular to the vertical side faces of the shoe, each pair of which surfaces are inclined downwardly and outwardly with respect to each other.

The reinforcing members 14 and 15 are arranged to extend through the upraised parts 23 and 24 at the two ends of the shoe. The supporting lug of the shoe consists of a strap 30 adapted to straddle the reinforcing member 15 adjacent its center portion. Suitable lips 31 at the lower ends of this strap 30 are provided for engaging with the under edge of the flanges of the channeled reinforcement. The strap 30 is also provided with a shoulder 32 adapted to engage the upper surface of the flanges of the channeled reinforcement so that the strap and reinforcement are held in place relatively to each other independently of the wearing insert or the body of the shoe. This is advantageous not only as it increases the strength of the shoe, but also as it facilitates the manufacture of the shoe as a result of the fact that the strap and the reinforcement do not have to be held in position separately while the wearing inserts are being cast in engagement therewith.

Figs. 4 to 10 illustrate a further form of construction in which the reinforcement consists of channeled members 33 arranged with their central webs vertical and the flanges 43 project laterally inward. The channeled reinforcement 33 is bent as a whole in two directions. In the first place, the reinforcement is bent in a vertical plane to correspond with the curvature of the brake shoe, and in the second place in a horizontal plane in order to bring the ends of the two reinforcing members nearer to each other at their ends than at the center. Preferably the insert employed consists of a single mass 34 cast in engagement with the two reinforcing members 33 so as to firmly grip each one independently of the body of the brake shoe and to connect them together so that the wearing insert and reinforcing members with the attaching lug 35 form a unitary structure around which the body of the shoe is subsequently cast. The connection between the wearing insert and the reinforcement is clearly shown in Figs. 8 and 9 from which it is seen that upstanding portions 36 are provided on the insert which extend between the two flanges of each reinforcement, as well as engaging both edges of the flanges. The main body of the insert itself is arranged to extend under the lower flange of each reinforcement. In this way a secure grip of the reinforcement is obtained. Curved connecting portions 37 are provided at each end to connect two halves of the insert together. In order to insure that the body of the brake shoe shall have as firm a grip as possible of the reinforcement and wearing insert at all parts, cutaway parts 38 and 39 are provided in the lower edges of the wearing insert, while apertures 40 are arranged in the vertical web of the reinforcement at each side of the upstanding portions 36 of the wearing insert. These cutaway parts and apertures are filled by the metal of the body of the shoe when the latter is cast around the reinforcement and wearing insert. The supporting strap 35 is provided with offset ends 41 arranged to contact with the upper side of the lower flange and the under side of the upper flange in order to be held firmly by the reinforcement independently of the wearing insert or the body of the shoe. Portions 42 of the wearing insert extend upwardly on either side of said offset ends in order to hold them in place longitudinally.

Having thus described the invention and illustrated its use, what is claimed as new and desired to be secured by Letters Patent is:—

1. Brake shoe comprising, in combination, a body portion, a reinforcing member, a strap member adapted to be brought into engagement with said reinforcing member by sliding movement only relatively to said reinforcing member, one of said members gripping the other between substantially horizontal surfaces.

2. Brake shoe comprising, in combination, a body portion, a flanged reinforcing member, a strap member having laterally offset ends adapted to be brought into engagement with said reinforcing member by sliding movement only relatively to said reinforcing member, one of said members gripping the other between substantially horizontal surfaces.

3. Brake shoe comprising, in combination, a body portion, a plurality of reinforcing members, a single insert of different metal from said body portion and of the general form of an annular ellipse having cast engagement with all of said reinforcing members.

4. Brake shoe comprising, in combination, a body portion, a reinforcing member, a strap member, one of said members gripping the other between substantially horizontal surfaces, and an insert of different material than said body portion having cast engagement with said reinforcing member on a plurality of surfaces.

5. Brake shoes comprising, in combination, a body portion oppositely disposed reinforcing members of channeled cross section having their flanges laterally directed, and a strap member having end portions extending between and engaging both flanges of each of said reinforcing members.

6. Brake shoes comprising, in combination, a body portion, oppositely disposed reinforcing members of channeled cross section having their flanges laterally directed, and an insert having portions extending between and engaging both flanges of each of said reinforcing members.

7. Brake shoes comprising, in combination, a body portion, oppositely disposed reinforcing members of channeled cross section having their flanges laterally directed, an insert of different material to said body portion, both said insert and said body portion having portions extending between and engaging both flanges of each of said reinforcing members.

8. Brake shoes comprising a body portion, a reinforcing member of channeled cross-section having its flanges laterally directed, and an insert of different material to said body portion having a portion extending between and engaging both flanges of said reinforcing member.

9. A brake shoe comprising a body portion, a reinforcing member of channeled cross section having its flanges laterally directed and provided with apertures therein through which parts of said body portion extend, and an insert of different material to said body portion having a portion extending between and engaging both flanges of said reinforcing member between said apertures.

10. A brake shoe comprising a body portion, a pair of reinforcing members, and an insert engaging said reinforcing members of the general form of an annular ellipse adapted to hold one pair of ends of said reinforcing members in spaced relation independently of said body portion.

11. A brake shoe comprising a body portion, a pair of reinforcing members with converging ends and an insert engaging said reinforcing members adapted to hold one pair of ends of said reinforcing members in spaced relation independently of said body portion.

12. A brake shoe comprising a body portion and a pair of reinforcing members of channeled cross-section having their flanges laterally directed and having converging ends.

13. A brake shoe comprising a body portion and a pair of reinforcing members having converging ends and a wearing insert connecting each pair of ends.

14. A brake shoe comprising, in combination, a body portion, a reinforcing member having a laterally projecting flange, apertures in the vertical portion of said member and an insert of different material to said body portion engaging said flange intermediate said apertures.

15. A brake shoe comprising, in combination, a body portion, a flanged reinforcing member, a strap member adapted to be brought into engagement with said reinforcing member by sliding movement only relatively to said reinforcing member, one of said members gripping the other between substantially horizontal surfaces.

In testimony whereof I have hereunto signed my name in the presence of the two subscribing witnesses.

LILLA C. ROWELL,
*Executrix of last will and testament of Benton C. Rowell, deceased.*
Witnesses:
   RIDSDALE ELLIS,
   DONALD C. WILLIAMS.

Copies of this patent may be obtained for five cents each, by addressing the "Commissioner of Patents, Washington, D. C."